(12) United States Patent
Kitamura

(10) Patent No.: US 10,198,669 B2
(45) Date of Patent: Feb. 5, 2019

(54) IMAGE CLASSIFYING APPARATUS, IMAGE CLASSIFYING METHOD, AND IMAGE CLASSIFYING PROGRAM

(71) Applicant: FUJIFILM Corporation, Tokyo (JP)

(72) Inventor: Yoshiro Kitamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 24 days.

(21) Appl. No.: 15/464,997

(22) Filed: Mar. 21, 2017

(65) Prior Publication Data

US 2017/0277977 A1 Sep. 28, 2017

(30) Foreign Application Priority Data

Mar. 23, 2016 (JP) ................................. 2016-057865

(51) Int. Cl.
| | |
|---|---|
| *G06K 9/00* | (2006.01) |
| *G06K 9/62* | (2006.01) |
| *G06T 7/00* | (2017.01) |
| *G06N 3/08* | (2006.01) |
| *G06T 7/11* | (2017.01) |

(52) U.S. Cl.
CPC ............. *G06K 9/6267* (2013.01); *G06N 3/08* (2013.01); *G06T 7/0012* (2013.01); *G06T 7/11* (2017.01); *G06T 2200/04* (2013.01); *G06T 2207/10072* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 8,358,304 | B2 * | 1/2013 | Brabec ................... | G06T 15/00 345/419 |
| 2006/0251307 | A1 * | 11/2006 | Florin .................. | G06T 11/008 382/128 |
| 2009/0028403 | A1 * | 1/2009 | Bar-Aviv .............. | G06F 19/321 382/128 |

(Continued)

FOREIGN PATENT DOCUMENTS

| | | |
|---|---|---|
| JP | 2015-215837 A | 12/2015 |
| JP | 2016-6626 A | 1/2016 |

*Primary Examiner* — Hadi Akhavannik
(74) *Attorney, Agent, or Firm* — Birch, Stewart, Kolasch & Birch, LLP.

(57) ABSTRACT

[Objective]
To enable a three dimensional image to be accurately classified into a plurality of classes with a small amount of calculations, in an image classifying apparatus, an image classifying method, and an image classifying program.
[Constitution]
A three dimensional image is classified into a plurality of classes by a convolutional neural network, in which a plurality of processing layers are connected hierarchically. The convolutional neural network includes: a convoluting layer that administers a convoluting process on each of a plurality of two dimensional images, which are generated by the neural network administering a projection process on the three dimensional image according to a plurality of processing parameters; and a pooling layer that pools the values of the same position within each of the plurality of two dimensional images which have undergone the convoluting process.

8 Claims, 7 Drawing Sheets

(56) References Cited

U.S. PATENT DOCUMENTS

| | | | |
|---|---|---|---|
| 2009/0079738 A1* | 3/2009 | Liao | G06T 19/00 |
| | | | 345/427 |
| 2011/0110576 A1* | 5/2011 | Kreeger | G16H 50/50 |
| | | | 382/132 |
| 2011/0122138 A1* | 5/2011 | Schmidt | G06K 9/6253 |
| | | | 345/440 |
| 2011/0254845 A1* | 10/2011 | Oikawa | G06T 15/08 |
| | | | 345/427 |
| 2012/0207365 A1* | 8/2012 | Verstraeten | G06F 19/3437 |
| | | | 382/128 |
| 2015/0331832 A1* | 11/2015 | Minoya | G06F 17/10 |
| | | | 706/16 |
| 2015/0347831 A1* | 12/2015 | Tamatsu | H04N 5/144 |
| | | | 382/156 |
| 2016/0048984 A1* | 2/2016 | Frigo | G06T 11/008 |
| | | | 382/131 |

* cited by examiner

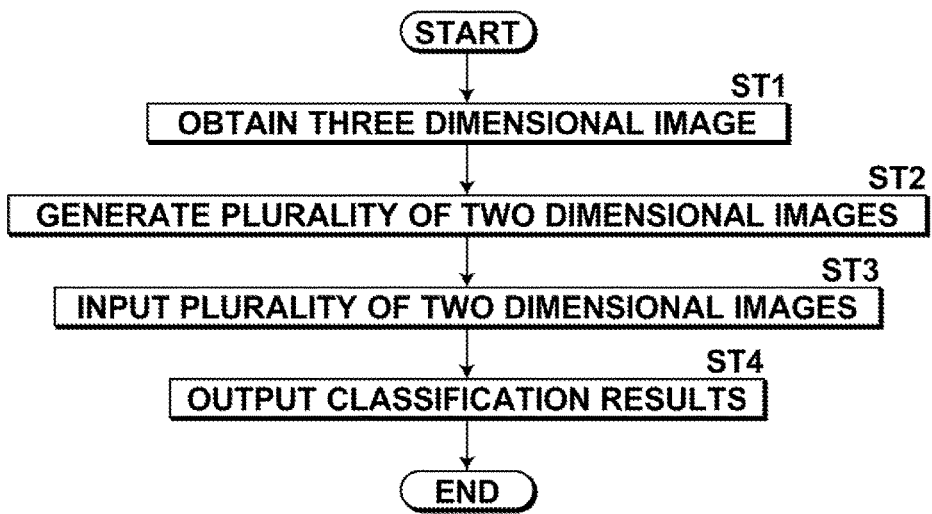
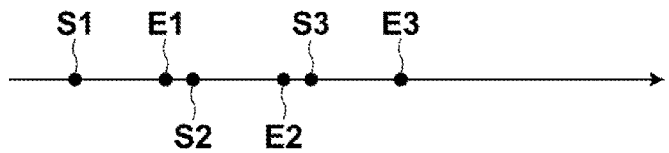

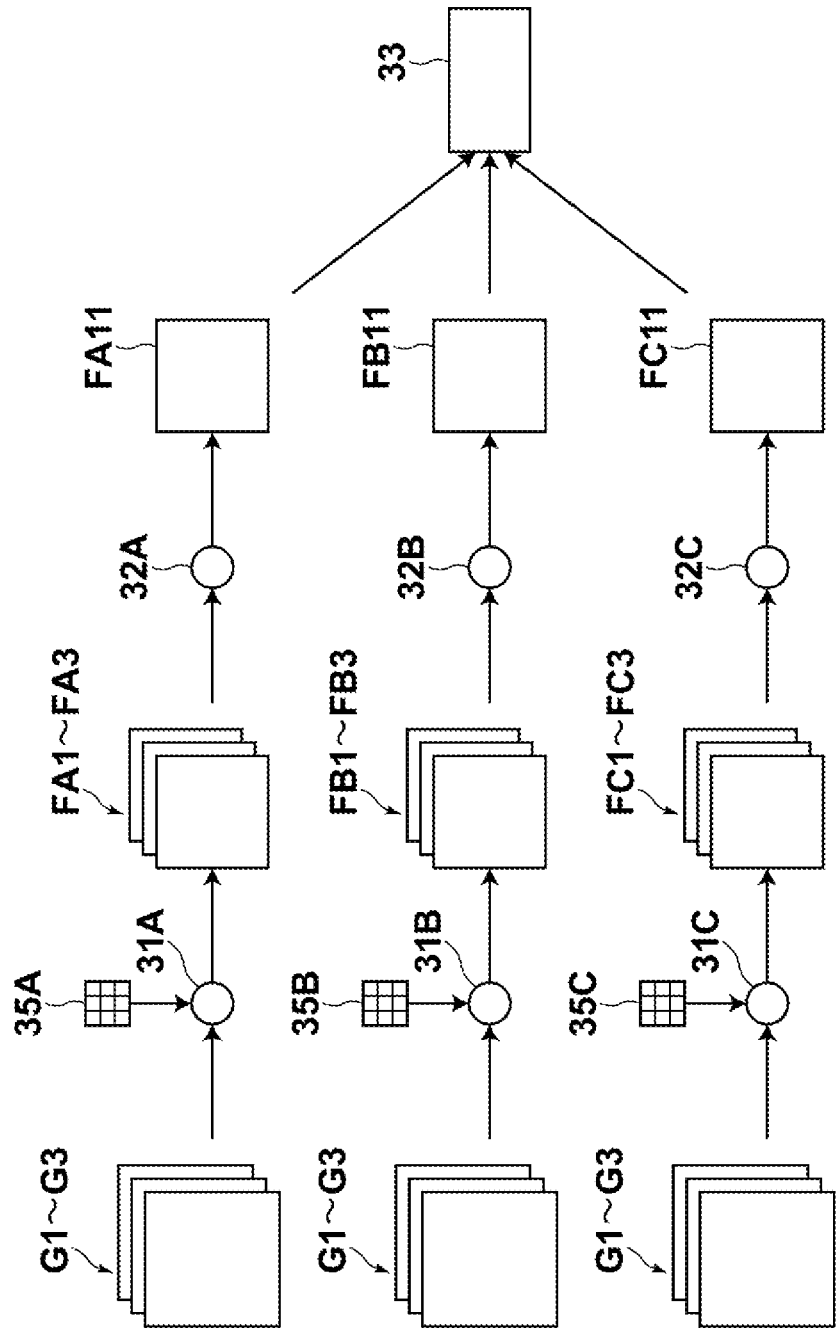

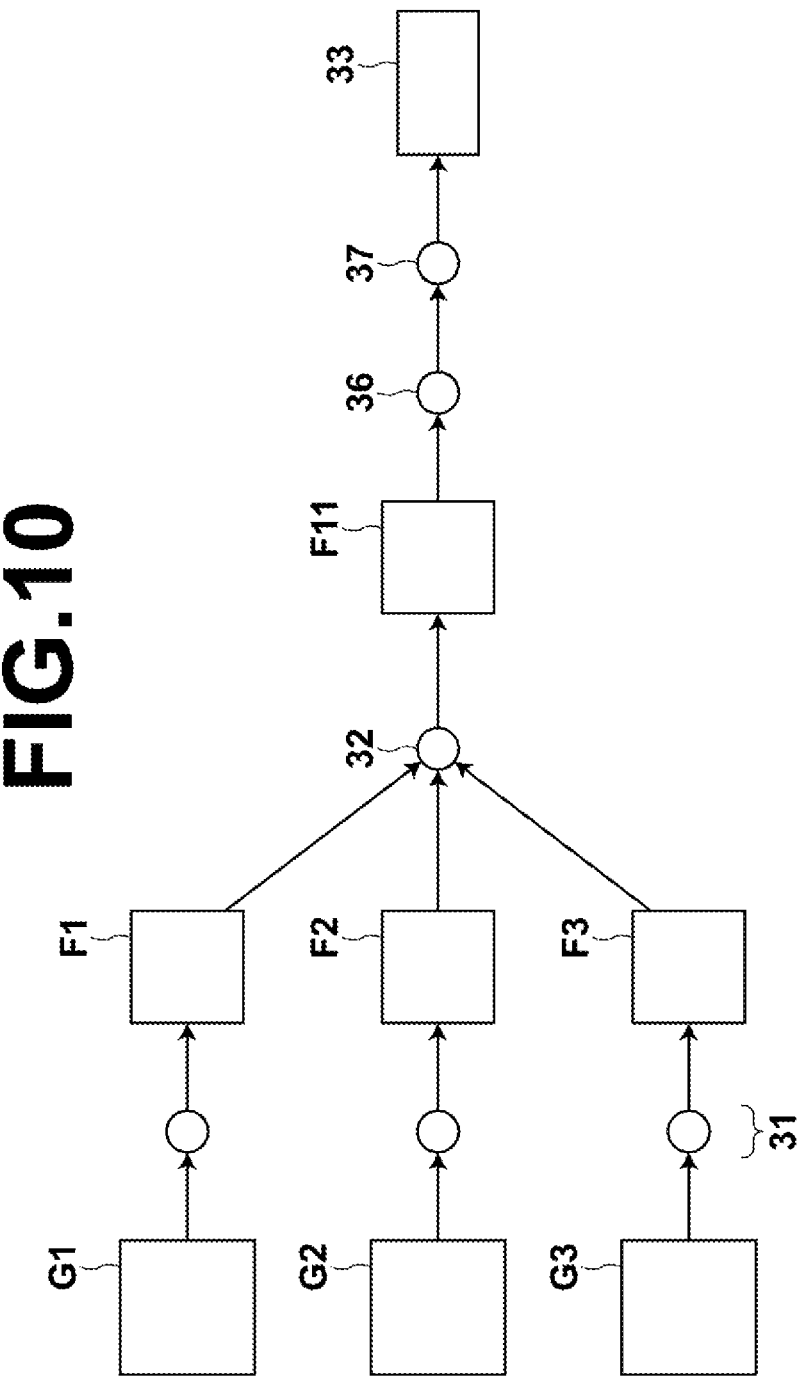

IMAGE CLASSIFYING APPARATUS, IMAGE CLASSIFYING METHOD, AND IMAGE CLASSIFYING PROGRAM

CROSS REFERENCE TO RELATED APPLICATIONS

The present application claims priority under 35 U.S.C. § 119 to Japanese Patent Application No. 2016-057865 filed on Mar. 23, 2016. The above application is hereby expressly incorporated by reference, in its entirety, into the present application.

BACKGROUND

The present disclosure is related to an image classifying apparatus, an image classifying method, and an image classifying program that classifies three dimensional images into a plurality of classes, by employing a neural network in which a plurality of processing layers are connected in a hierarchical manner.

Recently, high quality three dimensional images having high resolution are being employed for image diagnosis, accompanying advancements in medical technology (multiple detector CT (Computed Tomography), for example). Here, a three dimensional image is constituted by a great number of two dimensional images, and the amount of data is large. As a result, there are cases in which some time is required for a physician to find a desired portion for observation to perform diagnosis. Therefore, the visibility of organs as a whole or lesions is increased, to improve the efficiency of diagnosis, by specifying organs of interest, and then employing a method such as the MIP (Maximum Intensity Projection) method and the MinIP (Minimum Intensity Projection) method to extract organs of interest from a three dimensional image that includes the organs of interest and to perform MIP display. Alternatively, the visibility of organs as a whole or lesions is increased, by performing VR (Volume Rendering) display of a three dimensional image, to improve the efficiency of diagnosis.

In addition, in the case that a three dimensional image is VR displayed, structures of interest, such as organs, tissues, and structures, are extracted, and a color (R, G, and B) and an opacity is set for the signal value of each pixel, according to the signal value at each pixel position within the three dimensional image of the extracted structures. In this case, color templates, in which colors and opacities are set according to portions of interest, may be prepared, and a desired color template may be selected according to the portion. If such a configuration is adopted, a portion of interest can be visualized within a VR (Volume Rendering) image.

In addition, it is necessary to detect a structure within a three dimensional image, in order to extract the structure from the three dimensional image. Here, a calculation processing apparatus that executes calculations employing a neural network, which is constructed by hierarchically connecting a plurality of processing layers for classifying pixels of interest within an image into a plurality of classes, has been proposed. Particularly, a CNN (Convolutional Neural Network) has been proposed for use in calculation processing apparatuses that classify two dimensional images into a plurality of classes (refer to Japanese Unexamined Patent Publication Nos. 2015-215837 and 2016-006626).

In a convolutional neural network, a plurality of pieces of different calculation result data which are obtained with respect to input data by a previous level, that is, feature extraction result data, undergo a convoluting calculation process employing various kernels in a convoluting layer. Feature data obtained thereby are further pooled by a pooling layer, to decrease the amount of feature data. Then, the pooled processing result data undergo further calculation processes by subsequent processing layers, to improve the recognition rates of features, and the input data can be classified into a plurality of classes.

For example in a convolutional neural network that classifies two dimensional images into a plurality of classes, a convoluting process that employs various types of kernels is administered on input images at a convoluting layer, and a feature map constituted by feature data obtained by the convoluting process is pooled at a pooling layer. Further calculations are performed on a feature map which is obtained by pooling in subsequent processing layers following the pooling layer, to classify pixels of a processing target within the input images. Here, pooling has the effects of decreasing the amount of data, absorbing differences in geometric data within a target region, and obtaining the features of the target region in a robust matter. Specifically, calculating the maximum value, the minimum value, or the mean value of four pixels within 2 by 2 pixel regions within the feature map obtained by the convoluting process may be the pooling process.

Applying such a convolutional neural network to the aforementioned three dimensional images to classify the three dimensional images into a plurality of classes may be considered. For example, a convolutional neural network may learn to classify pixels of a processing target within a three dimensional image, which is employed as input, into a class that belongs to a structure of interest and a class that belongs to structures other than the structure of interest, when detecting the structure of interest within the three dimensional image. Thereby, it will become possible to accurately classify target pixels within the input three dimensional image as those of a structure of interest and those of other structures.

SUMMARY

However, the number of pixels within three dimensional images is greater than that of two dimensional images. Therefore, the amount of calculations which are required when performing classification by a convolutional neural network will become great. In addition, an extremely large amount of memory will be consumed during calculations. Further, if the number of pixels increases, the number of possible patterns within the images which are input into the convolutional neural network will become extremely great. For this reason, an enormous amount of data for learning will become necessary in order to construct a convolutional neural network for classifying three dimensional images. In this case, decreasing the amount of data to be input may be considered. However, the accuracy of classification will deteriorate if the amount of data is decreased.

The present disclosure has been developed in view of the foregoing circumstances. The present disclosure enables three dimensional images to be accurately classified into a plurality of classes employing a neural network with a small amount of calculations.

An image classifying apparatus of the present disclosure is an image classifying apparatus that classifies a three dimensional image into a plurality of classes by a neural network, in which a plurality of processing layers are hierarchically connected, comprising:

a convoluting layer that administers a convoluting process on each of a plurality of two dimensional images, which are generated by the neural network administering a projection process on the three dimensional image according to a plurality of processing parameters; and a pooling layer that pools the values of the same position within each of the plurality of two dimensional images which have undergone the convoluting process.

The expression "classifies a three dimensional image into a plurality of classes" means that each of the pixels that constitute the three dimensional image is classified into that which belongs to one of a plurality of structures which are included in the three dimensional image, or that each of the pixels that constitute the three dimensional image is classified as that which belongs to a specific structure which is included in the three dimensional image and that which belongs to other structures. In the former case, each of the pixels that constitute the three dimensional image would be classified as that belonging to one of the heart, the lung, and the liver, for example. In the latter case, each of the pixels that constitute the three dimensional image is classified as that which represents a blood vessel and those which do not represent a blood vessel. Note that if the three dimensional image is classified into a plurality of classes as in the latter case, the neural network may be constructed to judge whether the three dimensional image includes a specific structure. In addition, the expression "classifies a three dimensional image into a plurality of classes" also means that the three dimensional image itself or a region of a portion of the three dimensional image is classified as belonging to a specific portion. For example, the three dimensional image may be classified as a portion such as a thorax and an abdomen. Alternatively, the expression "classifies a three dimensional image into a plurality of classes" means that a region of the three dimensional image is classified as a thorax, and another region of the three dimensional image is classified as an abdomen.

At least one convoluting layer may be provided, and at least one pooling layer may be provided. In this case, one pooling layer may be provided for one convoluting layer, or one pooling layer may be provided for a plurality of convoluting layers.

Note that the image classifying apparatus according to the present disclosure may classify each of the pixels that constitute the three dimensional image into a plurality of classes.

In addition, in the image classifying apparatus according to the present disclosure, the projection process may be volume rendering, and the parameters may be at least one of color, opacity, and masks that define targets of projection.

The "masks that define targets of projection" refers to masks for administering projection processes such that only specific structures which are included in the three dimensional image are included in the two dimensional images. For example, in the case that a two dimensional image in which only the cardiac region is projected and a two dimensional image in which only the ventricular region is projected are to be generated, a mask for generating a two dimensional image in which only the cardiac region is projected and a mask for generating a two dimensional image in which only the ventricular region is projected may be employed as the parameters.

Alternatively, in the image classifying apparatus according to the present disclosure, the projection process may be one of the maximum intensity projecting process, the minimum intensity projecting process, and the mean intensity projecting process, and the parameters may be the start point position and the end point position with respect to the direction of the line of sight during projection.

In addition, in the image classifying apparatus according to the present disclosure, the two dimensional images may be two dimensional images of sub windows which are set within the three dimensional image.

In addition, the image classifying apparatus according to the present disclosure may further comprise a two dimensional image generating means for generating a plurality of two dimensional images.

An image classifying method according to the present disclosure is an image classifying method that classifies a three dimensional image into a plurality of classes employing neural network, in which a plurality of processing layers are hierarchically connected;

the neural network comprising a convoluting layer and a pooling layer;

the convoluting layer administering a convoluting process on each of a plurality of two dimensional images, which are generated by the neural network administering a projection process on the three dimensional image according to a plurality of processing parameters; and the pooling layer pooling the values of the same position within each of the plurality of two dimensional images which have undergone the convoluting process.

Note that the image classifying method according to the present disclosure may be provided as a program that causes a computer to execute the image classifying method.

According to the present disclosure, the convoluting layer of the neural network administers a convoluting process on each of a plurality of two dimensional images, which are generated by the neural network administering a projection process on the three dimensional image according to a plurality of processing parameters; and the pooling layer pools the values of the same position within each of the plurality of two dimensional images which have undergone the convoluting process. In this manner, the present disclosure employ the plurality of two dimensional images which are generated from the three dimensional image as input. Therefore, the amount of data of the images which are input into the neural network can be decreased compared to a case in which a three dimensional image is input. In addition, the two dimensional images are generated by administering projection processes on the three dimensional image using a plurality of parameters, and the values of the same positions within each of the plurality of two dimensional images which have undergone the convoluting process are pooled by the pooling layer. For this reason, the universality of the plurality of processing parameters with respect to the neural network can be secured. Thereby, the accuracy of classification of the input plurality of two dimensional images can be improved. Accordingly, the present disclosure is capable of classifying the three dimensional image into a plurality of classes with a small amount of calculations.

BRIEF DESCRIPTION OF THE DRAWINGS

FIG. 7 is a flow chart that illustrates the processes which are performed by the present embodiment.

FIG. 8 is a diagram for explaining a plurality of processing parameters in the case that a projection process is performed.

FIG. 9 is a diagram that illustrates another example of a convolutional neural network.

FIG. 10 is a diagram that illustrates still another example of a convolutional neural network.

DETAILED DESCRIPTION OF THE PREFERRED EMBODIMENTS

Figure 1:
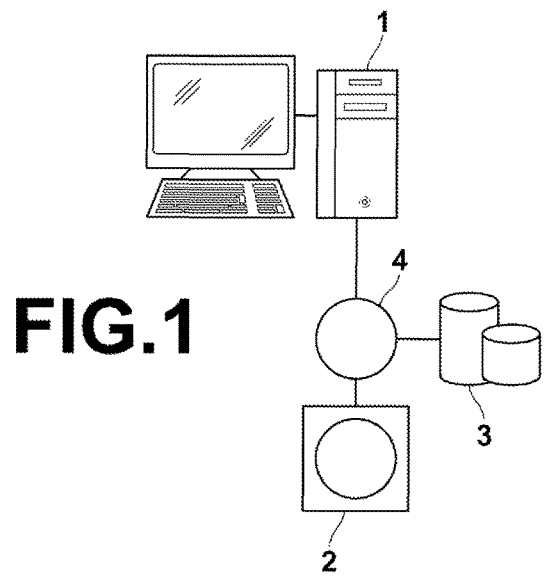
FIG. 1 is a hardware configuration diagram that illustrates the outline of a diagnosis assisting system to which an image classifying apparatus according to an embodiment of the present disclosure is applied.

Hereinafter, an embodiment of the present disclosure will be described with reference to the attached drawings. FIG. 1 is a hardware configuration diagram that illustrates the outline of a diagnosis assisting system to which an image classifying apparatus according to an embodiment of the present disclosure is applied. As illustrated in FIG. 1, an image classifying apparatus 1, a three dimensional image obtaining apparatus 2, and an image storage server 3 are connected in a communicable state via a network 4 in this system.

The three dimensional image obtaining apparatus 2 images portions which are targets of surgery, and generates three dimensional images V0 that represent these portions. Specifically, the three dimensional image obtaining apparatus 2 is a CT apparatus, an MRI (Magnetic Resonance Imaging) apparatus, a PET (Positron Emission Tomography) apparatus, etc. The three dimensional images V0 which are generated by the three dimensional image obtaining apparatus 2 are transmitted the image storage server 3, and stored therein.

The image storage server 3 is a computer that stores and manages various types of data, and is equipped with a large capacity external memory device and database management software. The image storage server 3 communicates with other apparatuses through wired or wireless connections, to transmit and receive image data and the like. Specifically, the image storage server 3 obtains image data such as the generated three dimensional images V0 via the network, and stores and manages the obtained image data in a recording medium such as the large capacity external memory device. Note that the storage format and communications among the apparatuses via the network 4 are based on a protocol such as the DICOM (Digital Imaging and COmmunication in Medicine) protocol.

The image classifying apparatus 1 is a single computer, in which an image classifying program of the present disclosure is installed. The computer may be a work station or a personal computer that a physician that performs diagnosis directly operates, or may be a sever which is connected to such a work station or a personal computer via a network. The image classifying program is recorded on recording media such as a DVD (Digital Versatile Disc) and a CD-ROM (Compact Dick Read Only Memory) which are distributed, and installed onto the tablet terminal from the recording medium. Alternatively, the evaluating program is stored in a recording device of a server computer connected to a network or in a network storage, in a state accessible from the exterior, downloaded to the computer which is utilized by the physician according to a request, then installed therein.

Figure 2:
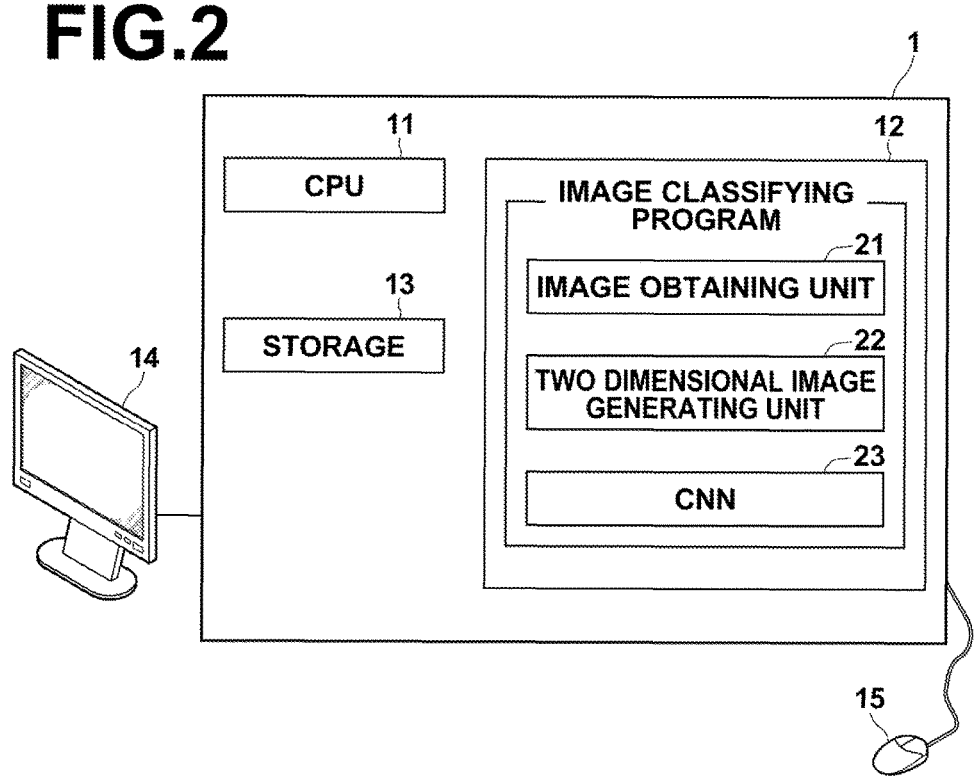
FIG. 2 is a diagram that schematically illustrates the configuration of an image classifying apparatus which is realized by installing an image classifying program in a computer.

FIG. 2 is a schematic diagram that illustrates the configuration of an image classifying apparatus which is realized by installing the evaluating program in a computer. As illustrated in FIG. 2, the image classifying apparatus 1 is equipped with a CPU (Central Processing Unit) 11, a memory 12, and a storage 13, as standard components of a work station. In addition, a display 14 and an input unit 15 such as a mouse are connected to the image classifying apparatus 1.

The storage 13 has recorded therein various types of data, including the three dimensional images V0 which are obtained from the image storage server 3 via the network 4, and data necessary for processes which are performed by the image classifying apparatus 1 as will be described later.

In addition, the image classifying program is stored in the memory 12. In addition, the memory 12 also functions as a workspace for processes which are performed by the image classifying program. The image classifying program defines an image obtaining process that obtains a three dimensional image V0 which has been obtained by the three dimensional image obtaining apparatus 2; a two dimensional image generating process that generates a plurality of two dimensional images by administering projection processes on the three dimensional image V0 employing a plurality of processing parameters; and a classifying process that classifies the three dimensional image V0 into a plurality of classes employing a convolutional neural network, in which a plurality of processing layers are hierarchically connected, as processes to be executed by the CPU 11. Note that the image classifying apparatus 1 of the present embodiment classifies each pixel of the three dimensional image V0 into two classes, which are those that represent blood vessels and those that do not represent blood vessels.

The computer functions as an image obtaining unit 21, a two dimensional image generating unit 22, and a convolutional neural network (hereinafter, referred to as "CNN") 23, by the CPU 11 executing these processes according to the program. Note that the image classifying apparatus 1 may be equipped with a plurality of processors that respectively execute the image obtaining process, the two dimensional image generating process, and the classification process by the CNN 23.

The image obtaining unit 21 obtains a three dimensional image V0 from the image storage server 3. In the case that a three dimensional image V0 is already stored in the storage 13, the image obtaining unit 21 may obtain the three dimensional image V0 from the storage 13.

The two dimensional image generating unit 22 generates a plurality of two dimensional images, by administering projection processes on the three dimensional image V0 according to a plurality of processing parameters. In the present embodiment, a three dimensional sub window is set within the three dimensional image V0, and the image within the sub window is projected by volume rendering according to a plurality of processing parameters, to generate a plurality of two dimensional images.

That is, virtual light rays are irradiated from a projection plane which is a viewpoint position with respect to the three dimensional image V0 within the sub window, and a three dimensional image constituted by virtual light reflected by the interior of an object is generated, based on colors (R, G, and B) and opacities corresponding to each signal value within the three dimensional image V0. Thereafter, projection images, which are perspective views of three dimensional structures within the interior of the object, are generated from the three dimensional image on the projection plane as two dimensional images.

Note that the colors and opacities are defined in color templates. In the present embodiment, a plurality of types of color templates are prepared as a plurality of processing parameters. The two dimensional image generating unit 22 converts the signal value at each pixel position of the three dimensional image V0 within the sub window to pixel values of the projected images based on the colors and opacities which are set in each of the plurality of color templates, to generate a plurality of two dimensional images. In the present embodiment, three types of color templates are employed to generate three two dimensional images G1 through G3. Note that the color templates may define only colors, or may only define opacities.

The two dimensional images G1 through G3, which are generated employing a plurality of processing parameters in this manner, include that in which it is difficult to discriminate blood vessels, that in which only arteries can be discriminated, and that in which both arteries and veins can be discriminated.

Figure 3:
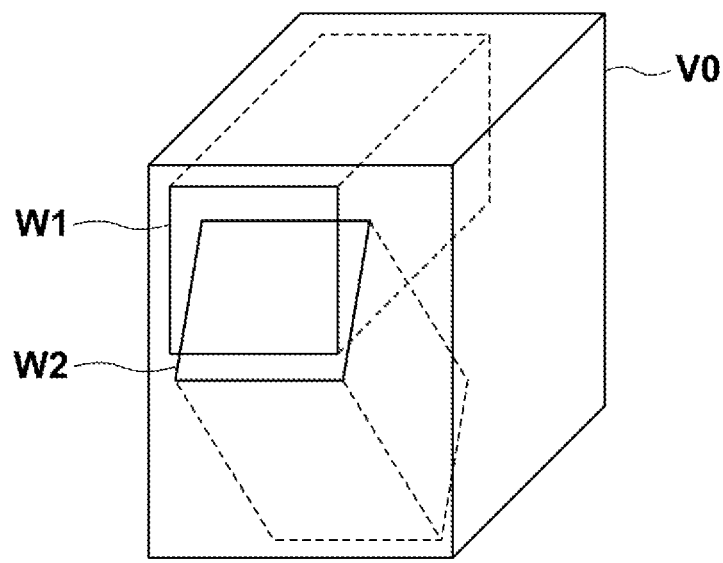
FIG. 3 is a diagram for explaining the setting of a sub window within a three dimensional image.

The two dimensional image generating unit 22 generates a plurality of two dimensional images employing a plurality of processing parameters at each position and orientation of the sub window, while changing the position and orientation of the sub window within the three dimensional image V0. That is, the two dimensional image generating unit 22 sets a sub window W1 within the three dimensional image V0, and generates a plurality of two dimensional images by performing volume rendering on the image within the sub window W1 employing a plurality of processing parameters, as illustrated in FIG. 3. The two dimensional image generating unit 22 further sets a sub window W2 having a different position and orientation from the sub window W1, and performs volume rendering on the image within a sub window W2 employing a plurality of processing parameters, to generate a plurality of two dimensional images. Note that as illustrated in FIG. 3, the sub windows W1 and W2 are three dimensional windows of which the planes most toward the viewpoint positions in the direction of the lines of sight are indicated by solid lines. The two dimensional image generating unit 22 sets sub windows with respect to the entirety of the three dimensional image V0 while changing the positions and orientations thereof, and generates a plurality of two dimensional images employing a plurality of processing parameters. Note that a plurality of two dimensional images are input to the CNN 23 for each sub window, and become subjects of processing.

Figure 4:
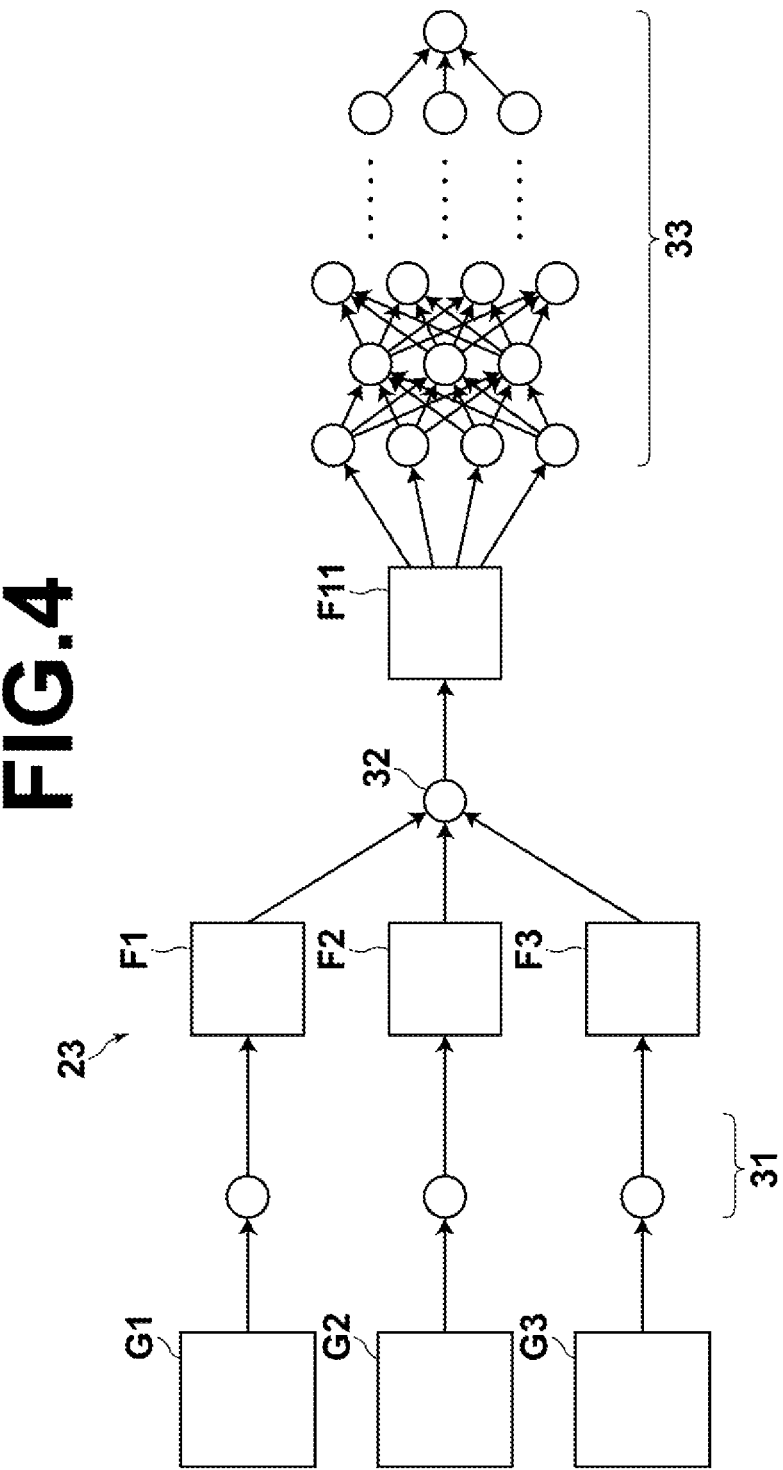
FIG. 4 is a diagram that conceptually illustrates the construction of a convolutional neural network.

The CNN 23 employs the two dimensional images G1 through G3 as inputs, and outputs classification results indicating whether the pixels at the center positions of the two dimensional images G1 through G3 represent a blood vessel or does not represent a blood vessel. FIG. 4 is a diagram that conceptually illustrates the configuration of the CNN 23. As illustrated in FIG. 4, the CNN 23 is constituted by plurality of processing layers that include a convoluting layer 31, a pooling layer 32, and a total coupling layer 33, which are connected in a hierarchical manner.

Figure 5:
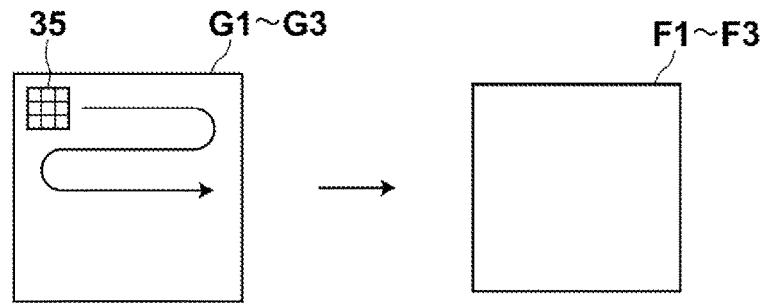
FIG. 5 is a diagram for explaining a convoluting process.

The convoluting layer 31 employs kernels which are determined in advance, to administer convoluting processes on the plurality of two dimensional images G1 through G3. FIG. 5 is a diagram for explaining the convoluting process. As illustrated in FIG. 5, the convoluting layer 31 applies a kernel 35 to administer convoluting processes on the two dimensional images G1 through G3. The kernel 35 is of an n pixel by n pixel size (n=3, for example), and weights are set for each element. For example, a differential filter that emphasizes edges within the two dimensional images G1 through G3 is set. The convoluting layer 31 applies the kernel 35 to the entireties of the two dimensional images G1 through G3 while shifting a pixel of interest of the kernel. That is, the kernel 35 is employed to filter the two dimensional images G1 through G3. Further, the convoluting layer 31 applies an activating function such as a sigmoid function to convoluted values, to output feature maps F1 through F3. Note that if the pixel size of the two dimensional images G1 through G3 is designated as xg, yg, and the size of the kernel 35 is designated as xk, yk, the pixel size xt, yt of the feature maps F1 through F3 can be expressed by Formula (1) below.

$$xt=xg-xk+1$$

$$yt=yg-yk+1 \qquad (1)$$

Note that in FIG. 4, the convoluting layer 31 has three units represented by circular shapes, which respectively correspond to each of the two dimensional images G1 through G3. Alternatively, the convoluting layer 31 may have only one unit, and the two dimensional images G1 through G3 may be processed sequentially.

Figure 6:
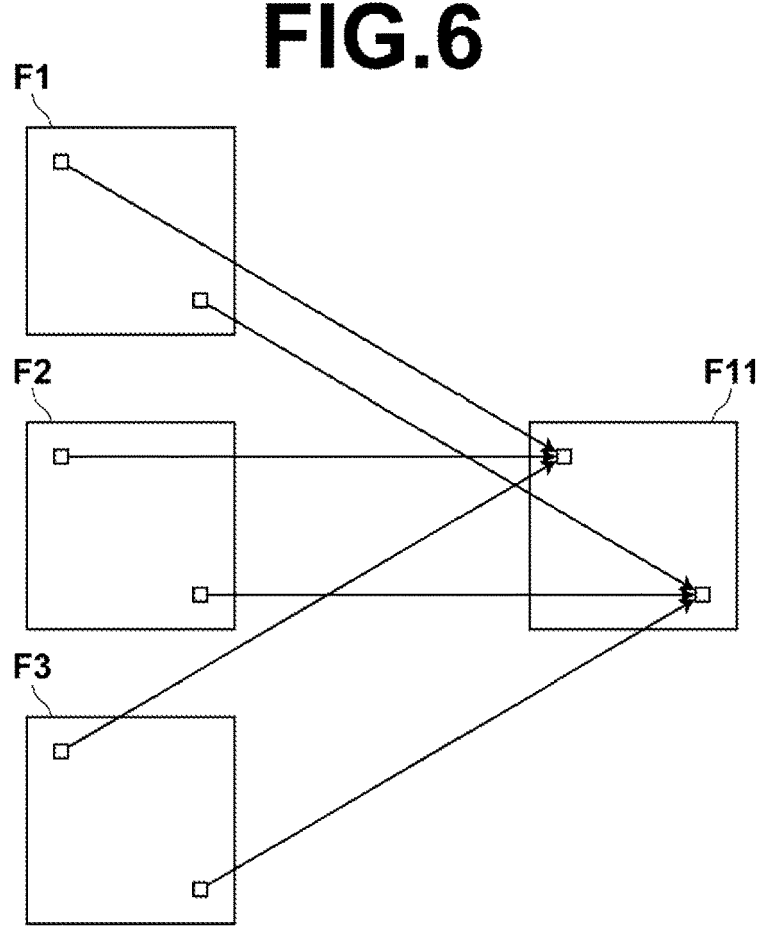
FIG. 6 is a diagram for explaining a pooling process.

The pooling layer 32 pools the feature maps F1 through F3 which are output from the convoluting layer 31. FIG. 6 is a diagram for explaining the pooling process. As illustrated in FIG. 6, in the present embodiment, the pooling layer 32 pools three values at the same position in the feature maps F1 through F3 into a single value, and outputs a feature map F11 which is the same size as the feature maps F1 through F3. Specifically, the maximum value from among the three values is pooled. Note that the mean value or the minimum value of the three values may be pooled instead of the maximum value. By performing the pooling process in this manner, the amount of data of the feature map F11 which is input to the total coupling layer 33 can be reduced, without losing the features of the positions within the two dimensional images G1 through G3.

In addition, the two dimensional images G1 through G3 which are input to the CNN 23 have undergone projection processes employing different processing parameters. Therefore, the two dimensional images G1 through G3 include that in which it is difficult to discriminate blood vessels, that in which only arteries can be discriminated, and that in which both arteries and veins can be discriminated. By pooling the maximum values or the like among three values in the pooling layer 32 as described above, the maximum values or the like are pooled independent of the processing parameters. Therefore, universality of the plurality of processing parameters that were employed when generating the two dimensional images G1 through G3 can be secured.

The total coupling layer 33 has a configuration similar to that of a common multiple layer neural network, and is a layer in which all of the units of the plurality of processing layers are connected. Note that the units are indicated by circular shapes in FIG. 4. In addition, the links among units are indicated by arrows that point toward an output side from an input side. The feature map F11 is input to the total coupling layer 33, and the total coupling layer 33 outputs classification results indicating whether the pixel at a sub window for which the two dimensional images G1 through G3 were generated represents a blood vessel or does not represent a blood vessel. Here, if the input into a processing layer within the total coupling layer from a plurality of units of a preceding processing layer is designated as xj, the output of the processing layer is designated as yi, the weighting of the link among the units is designated as wij, and a bias is designated as bi, the output yi is represented by Formula (2) below. Note that f in Formula (2) is an activating function such as a sigmoid function. The weighting wij and the bias bi in Formula (2) is calculated by learning, to be described later.

$$yi = f\left(\sum_j wij \cdot xj + bj\right) \quad (2)$$

An output layer, which is the final hierarchical layer of the total coupling layer 33, outputs classification results that indicate whether the pixels at the center positions of sub windows represent a blood vessel. For example, a value of 1 is output in the case that a pixel represents a blood vessel, and a value of 0 is output in the case that a pixel does not represent a blood vessel. Thereby, the CNN 23 is capable of classifying the pixels at the center positions of the sub windows into two classes, which are "blood vessel" and "non blood vessel".

Next, learning by the CNN 23 will be described. A known error back propagation method is employed for learning by the CNN 23. A great number of pieces of positive teacher data and a great number of pieces of negative teacher data are prepared for learning by the CNN 23. The pieces of positive teacher data are two dimensional images which are generated by volume rendering, which are of the same size as the sub windows, and in which the pixel at the center position thereof represents a blood vessel. The pieces of negative teacher data are two dimensional images which are generated by volume rendering, which are of the same size as the sub windows, and in which the pixel at the center position thereof does not represent a blood vessel. Note that when generating the teacher data, images within sub windows which are set within a three dimensional image are projected employing the same plurality of processing parameters as those which are employed when generating the two dimensional images G1 through G3. Thereby, three types of teacher data are generated with respect to an image within each sub window.

The teacher data are input into the CNN 23, and classification results are output. Next, the results which are output are compared to the teacher data, and the weightings of the links among each hierarchical layer in the units which are included in the total coupling layer 33 and the biases are corrected according to whether the output results are correct or incorrect. Correction of the weightings and the biases is performed employing a great number of positive and negative teacher data for a predetermined number of times, or until the accuracy rate of the output classification results become 100%, and the learning ends.

Next, the processes which are performed by the present embodiment will be described. FIG. 7 is a flow chart that illustrates the processes which are performed by the present embodiment. First, the image obtaining unit 21 obtains a three dimensional image V0 (step ST1), and the two dimensional image generating unit 22 administers projection processes on the three dimensional image V0 employing a plurality of processing parameters, to generate a plurality of two dimensional images G1 through G3 (step ST2). Next, the CNN 23 received input of the plurality of two dimensional images G1 through G3 (step ST3) then outputs classification results (step ST4), and the process ends.

Note that by generating a plurality of two dimensional images while changing the position and orientation of the sub window within the three dimensional image V0 and performing the classification process described above, judgement results regarding whether each pixel included in the three dimensional image V0 represents a blood vessel can be output. By employing these judgment results, the blood vessel can be extracted from the three dimensional image V0, and a volume rendering image of the extracted blood vessel may be displayed on the display 14.

As described above, in the present embodiment, the convoluting layer 31 administers a convoluting process on each of the plurality of two dimensional images G1 through G3, which are generated by administering a projection process on the three dimensional image V0 according to a plurality of processing parameters; and the pooling layer 32 pools the values of the same position within each of the plurality of two dimensional images which have undergone the convoluting process, that is, the feature maps F1 through F3. In this manner, the present embodiment employs the plurality of two dimensional images G1 through G3 which are generated from the three dimensional image V0 as input. Therefore, the amount of data of the images which are input into the CNN 23 can be decreased compared to a case in which the three dimensional image V0 is input. In addition, the two dimensional images G1 through G3 are generated by administering projection processes on the three dimensional image V0 using a plurality of parameters, and the values of the same positions within each of the plurality of feature maps F1 through F3 which have undergone the convoluting process are pooled by the pooling layer 32. For this reason, the universality of the plurality of processing parameters with respect to the CNN 23 can be secured. Thereby, the accuracy of classification of the input plurality of two dimensional images G1 through G3 can be improved. Accordingly, the present disclosure is capable of classifying the three dimensional image V0 into a plurality of classes with a small amount of calculations.

Note that in the embodiment described above, each pixel which is included in the three dimensional image V0 is classified into the two classes "blood vessel" and "non blood vessel". However, it is also possible to construct the CNN 23 to perform classification into three or more classes. For example, it is possible to construct the CNN 23 to classify each pixel which is included in the three dimensional image V0 into three classes, which are "heart", "lung", and "other structures". In this case, a great number of pieces of positive teacher data in which the center position of images represents a heart, a great number of pieces of positive teacher data in which the center position of images represents a lung, and a great number of pieces of negative teacher data in which the center position of images represents neither a heart or a lung may be prepared to perform learning.

In addition, in the embodiment described above, the CNN 23 may be constructed such that the three dimensional image V0 itself is classified as belonging to a specific portion. The CNN 23 may be constructed to classify the three dimensional image V0 as a portion such as a thorax or an abdomen, for example. Alternatively, the CNN 23 may be constructed to classify regions of the three dimensional image V0 as belonging to one of a plurality of specific portions. The CNN 23 may be constructed such that a region of the three dimensional image V0 is classified as a thorax, and another region of the three dimensional image V0 is classified as an abdomen, for example.

In addition, in the embodiment described above, the two dimensional image generating unit 22 performs volume rendering on the images within the sub windows employing a plurality of processing parameters, to generate a plurality of two dimensional images. Alternatively, a plurality of two dimensional images may be generated by performing one of a maximum intensity projecting process, a minimum intensity projecting process, and a mean intensity projecting process employing a plurality of processing parameters. In this case, the plurality of processing parameters may be the start point position and the end point position of a direction of a line of sight for projection. Specifically, pairs of start point positions and end point positions (S1, E1), (S2, E2), and (S3, E3) are set along an arrow that indicates the direction of a line of sight, as illustrated in FIG. 8. A maximum intensity projecting process, a minimum intensity projecting process, and a mean intensity projecting process may be performed between each pair of start point positions and end point positions, to generate a plurality of two dimensional images.

In addition, in the embodiment described above, the CNN 23 has one convoluting layer 31 and one pooling layer 32. Alternatively, the CNN 23 may have a plurality of convoluting layers 31 and a plurality of pooling layers 32. For example, the CNN 23 may be constructed to have three convoluting layers 31A through 31C and three pooling layers 32A through 32C that respectively pool the outputs of the convoluting layers 31A through 31C, as illustrated in FIG. 9. In this case, three two dimensional images G1 through G3 are input to each of the convoluting layers 31A through 31C, and the convoluting layers 31A through 31C respectively output three feature maps FA1 through FA3, FB1 through FB3, and FC1 through FC3. Kernels 35A through 35C which are utilized by each of the convoluting layers 31A through 31C are set to generate feature maps which are different from each other. Accordingly, the feature maps FA1 through FA3, FB1 through FB3, and FC1 through FC3 which are respectively output from of the convoluting layers 31A through 31C each represent different features of the two dimensional images G1 through G3.

Each of the feature maps FA1 through FA3, FB1 through FB3, and FC1 through FC3 is respectively pooled by the pooling layers 32A through 32C, and feature maps FA11 through FC11 are output. The feature maps FA11 through FC11 are input to the total coupling layer 33, and classification results are output from the total coupling layer 33.

As a further alternative, a convoluting layer 36 that performs a convoluting process on the feature map F11 different from that performed by the convoluting layer 31 and a pooling layer 37 that pools the output of the convoluting layer 36 may be provided in addition to the convoluting layer 31 and the pooling layer 32, as illustrated in FIG. 10. In this case, the pooling layer 37 performs pooling by extracting the maximum value, the minimum value, the mean value, or the like from among four values within 2 by 2 pixel regions within the feature map which is output by the convoluting layer 36, for example. Note that a further convoluting layer and a pooling layer may be provided after the pooling layer 37. In addition, a further convoluting layer and a pooling layer may also be provided after the pooling layers 32A through 32C illustrated in FIG. 9, in the same manner as the CNN 23 illustrated in FIG. 10.

In addition, in the embodiment described above, a plurality of masks that define targets within the three dimensional image V0 to be projected may be employed as the processing parameters when generating the two dimensional images. For example, masks M1 through M3 that extract a cardiac region, a ventricular region, and an atrial region from the three dimensional image V0 may be employed, and volume rendering may be administered on the three dimensional image V0 employing the masks M1 through M3, to generate three two dimensional images. In this case, the colors and opacities of the three two dimensional images may be set to be constant, a plurality of types of color templates may be prepared in the same manner as that described above, and two dimensional images having different colors and opacities may be generated for each of the projected regions. In this case as well, the color templates may define only colors, or define only opacities. In addition, in this case, a greater number of two dimensional images will be generated. Therefore, the CNN 23 may have a greater number of convoluting layers that the embodiment described above.

What is claimed is:

1. An image classifying apparatus that classifies a three dimensional image into a plurality of classes, said image classifying apparatus comprising:
    a memory storing an image classifying program; and
    a processor that executes the image classifying program to function as a neural network in which a plurality of processing layers are hierarchically connected, the neural network comprising:
    a convoluting layer that administers a convoluting process on each of a plurality of two dimensional images by administering a projection process on the three dimensional image according to a plurality of processing parameters; and
    a pooling layer that pools the values of the same position within each of the plurality of two dimensional images which have undergone the convoluting process.

2. An image classifying apparatus as defined in claim 1, wherein:
    each of the pixels that constitute the three dimensional image is classified into a plurality of classes.

3. An image classifying apparatus as defined in claim 1, wherein:
    the projection process is volume rendering; and
    the parameters are at least one of color, opacity, and masks that define targets of projection.

4. An image classifying apparatus as defined in claim 1, wherein:
    the projection process is one of the maximum intensity projecting process, the minimum intensity projecting process, and the mean intensity projecting process; and
    the parameters are start point positions and end point positions with respect to the direction of the line of sight during projection.

5. An image classifying apparatus as defined in claim 1, wherein:
    the two dimensional images are two dimensional images of sub windows which are set within the three dimensional image.

6. An image classifying apparatus as defined in claim 1, wherein said processor further functions as:
    a two dimensional image generating unit for generating a plurality of two dimensional images.

7. An image classifying method that classifies a three dimensional image into a plurality of classes, said method comprising:
    employing a neural network, in which a plurality of processing layers are hierarchically connected, to perform image classifying;
    the neural network comprising a convoluting layer and a pooling layer;
    the convoluting layer administering a convoluting process on each of a plurality of two dimensional images by administering a projection process on the three dimensional image according to a plurality of processing parameters; and the pooling layer pooling the values of the same position within each of the plurality of two dimensional images which have undergone the convoluting process.

8. A non-transitory recording medium having stored therein a program that causes a computer to execute an image classifying method that classifies a three dimensional image into a plurality of classes by functioning as a neural network, in which a plurality of processing layers are hierarchically connected;
- the neural network comprising a convoluting layer and a pooling layer;
- the convoluting layer administering a convoluting process on each of a plurality of two dimensional images by administering a projection process on the three dimensional image according to a plurality of processing parameters; and
- the pooling layer pooling the values of the same position within each of the plurality of two dimensional images which have undergone the convoluting process.

* * * * *